US012790756B2

(12) United States Patent
Nyflött et al.

(10) Patent No.: US 12,790,756 B2
(45) Date of Patent: Nov. 10, 2026

(54) HEAT-SEALABLE PAPERBOARD

(71) Applicant: Stora Enso OYJ, Helsinki (FI)

(72) Inventors: Åsa Nyflött, Karlstad (SE); Chris Bonnerup, Floda (SE); Magnus Ekberg, Fors (SE)

(73) Assignee: Stora Enso OYJ, Helsinki (FI)

( * ) Notice: Subject to any disclaimer, the term of this patent is extended or adjusted under 35 U.S.C. 154(b) by 1188 days.

(21) Appl. No.: 17/425,423

(22) PCT Filed: Jan. 24, 2020

(86) PCT No.: PCT/IB2020/050553
§ 371 (c)(1),
(2) Date: Jul. 23, 2021

(87) PCT Pub. No.: WO2020/152635
PCT Pub. Date: Jul. 30, 2020

(65) Prior Publication Data
US 2022/0162804 A1 May 26, 2022

(30) Foreign Application Priority Data
Jan. 25, 2019 (SE) .................................... 1950089-1

(51) Int. Cl.
*D21H 19/82* (2006.01)
*C09D 109/08* (2006.01)
(Continued)

(52) U.S. Cl.
CPC ......... *D21H 19/826* (2013.01); *C09D 109/08* (2013.01); *C09D 123/14* (2013.01);
(Continued)

(58) Field of Classification Search
None
See application file for complete search history.

(56) References Cited

U.S. PATENT DOCUMENTS 5,635,279 A 6/1997 Ma et al.
5,654,039 A * 8/1997 Wenzel ................ D21H 19/826 162/137
(Continued)

FOREIGN PATENT DOCUMENTS

EP 0543793 A1 5/1993
EP 2358942 A2 8/2011
(Continued)

OTHER PUBLICATIONS

International Search Report from corresponding PCT application No. PCT/IB2020/050553 mailed on May 27, 2020.

*Primary Examiner* — Tamra L. Dicus
(74) *Attorney, Agent, or Firm* — Greer, Burns & Crain, Ltd.

(57) ABSTRACT

The invention relates to a heat-sealable paperboard comprising a paperboard substrate (1) comprising a first side and a second side, a first dispersion coating layer (2) on the first side of the paperboard substrate (1), and a second dispersion coating layer (3) on the first dispersion coating layer (2), wherein the first dispersion coating layer (2) comprises a latex and pigment and the second dispersion coating layer (3) comprises a polyolefin.

13 Claims, 1 Drawing Sheet

(51) Int. Cl.

| | |
|---|---|
| ***C09D 123/14*** | (2006.01) |
| ***D21H 19/22*** | (2006.01) |
| ***D21H 19/40*** | (2006.01) |
| ***D21H 19/62*** | (2006.01) |
| ***D21H 19/76*** | (2006.01) |
| ***D21H 19/84*** | (2006.01) |

(52) U.S. Cl.

CPC ............. *D21H 19/22* (2013.01); *D21H 19/40* (2013.01); *D21H 19/62* (2013.01); *D21H 19/76* (2013.01); *D21H 19/84* (2013.01)

(56) References Cited

U.S. PATENT DOCUMENTS

| | | | | |
|---|---|---|---|---|
| 5,837,383 | A * | 11/1998 | Wenzel | D21H 19/40 428/903.3 |
| 5,979,653 | A * | 11/1999 | Owens | B65D 81/2007 426/123 |
| 9,771,688 | B2 | 9/2017 | Pang et al. | |
| 2004/0121079 | A1 * | 6/2004 | Urscheler | D21H 19/82 427/420 |
| 2005/0112387 | A1 | 5/2005 | Druckrey et al. | |
| 2011/0262745 | A1 | 10/2011 | Ronka | |
| 2016/0348318 | A1 | 12/2016 | Koenig et al. | |
| 2018/0058010 | A1 * | 3/2018 | Mongrain | D21H 19/62 |
| 2018/0112427 | A1 * | 4/2018 | Bryan | B32B 1/00 |
| 2018/0119358 | A1 * | 5/2018 | Larsson | B41M 5/52 |
| 2018/0142418 | A1 * | 5/2018 | Sundholm | D21H 25/06 |
| 2019/0257034 | A1 * | 8/2019 | Pang | D21H 19/60 |
| 2019/0352854 | A1 * | 11/2019 | Backfolk | D21H 21/16 |
| 2020/0070486 | A1 * | 3/2020 | Ashby | B32B 27/365 |
| 2021/0017717 | A1 * | 1/2021 | Backfolk | D21H 27/30 |

FOREIGN PATENT DOCUMENTS

| | | | | |
|---|---|---|---|---|
| JP | 2008087784 | A | 4/2008 | |
| JP | 2009244591 | A | 10/2009 | |
| JP | 2010084244 | A | 4/2010 | |
| WO | 9854410 | | 12/1998 | |
| WO | 02053838 | A1 | 7/2002 | |
| WO | 2006007239 | A2 | 1/2006 | |
| WO | 2013098026 | A1 | 7/2013 | |
| WO | 2015155413 | A1 | 10/2015 | |
| WO | WO-2018116118 | A1 * | 6/2018 | D21H 19/60 |

* cited by examiner

HEAT-SEALABLE PAPERBOARD

This application is a U.S. National Phase under 35 U.S.C. § 371 of International Application No. PCT/IB2020/050553, filed Jan. 24, 2020, which claims priority under 35 U.S.C. §§ 119 and 365 to Swedish Application No. 1950089-1, filed Jan. 25, 2019.

The present invention relates to coated paper or paperboard, and particularly relates to a heat-sealable paperboard usable as packaging material for liquids or frozen food.

Fiber based material used in packages or cups for liquids or frozen food is usually provided with barrier coatings both on the inside, which faces the packed item, and on the outside which provides the print-side of the package. The barrier coating applied on the inside makes the material resistant against e.g. liquids, grease, oxygen and/or aroma and enables it to withstand the influence of the packed item on the packing material. The barrier coating should also be heat-sealable. Barrier coating of paperboard has long been dominated by lamination with low-cost, readily available polyolefins, such as polyethylene (PE) or polypropylene (PP). Today, also bio-based versions thereof are used including other bio-based polymers such as polylactic acid (PLA). Liquid packaging board is usually provided with a laminated polymer coating on both sides and oftentimes with an additional aluminum coating layer on the inside.

Extrusion coated packaging materials including several layers of polyolefins and aluminum foil are hard to re-pulp due to problems in separating the plastic coating from the paperboard. This has increased the interest for dispersion barrier coated paperboard, wherein an aqueous dispersion of fine polymer particles is applied on the paperboard surface. The coatings can be based on e.g. styrene-acrylate (SA) or styrene-butadiene (SB) latex or polyolefin dispersions. Various dispersion coated paperboard materials have been disclosed in regards of repulpable materials providing barrier properties. WO 2015/155413 A1, for example, discloses a coated food cardboard which comprises a cardboard layer and a coating layer on at least one side, wherein a barrier layer is arranged between the coating layer and the cardboard containing binder and slate-like mineral pigment. The coating layer comprises light-refracting pigment or mixture of pigments and a binder, which may be a synthetic latex of polymers of e.g. butadiene-styrene type copolymers. U.S. Pat. No. 9,771,688 discloses a coated paperboard comprising a base coat and a top coat, each comprising binder and pigment. The teaching refers to styrene-acrylate copolymer or styrene-butadiene copolymer as binders. EP 2358942 discloses a recyclable coated paperboard coated with a first and second coating layer formed from an aqueous polymer dispersion, where each layer consists of from about 70 to about 90 wt % of polymer emulsion and 10 to about 30 wt % pigments. The teaching only refers to coatings of acrylic polymers and copolymers, copolymers of styrene and butadiene, vinyl acetate polymers, polyvinyl alcohol, or polyethylene vinyl acetate containing pigments. WO 2018/116118 A1 discloses a heat-sealable packaging material comprising a first and a second dispersion barrier layer on the print side, wherein both dispersion barrier layer comprise a latex, preferably a styrene-butadiene or a styrene-acrylate latex.

One problem related to dispersion barrier coated paperboard is that the coating may crack during conversion to packaging, whereby the barrier at the folding lines may deteriorate. Thus, there remains a need for a coated paperboard that is suitable for the manufacturing of packaging or cups for liquids or food, which is repulpable, provides the required barrier against moisture and liquid, and has good mechanical properties.

This object is met with the heat-sealable paperboard, the method of manufacturing the heat-sealable paperboard, and a packaging comprising or being made from the heat-sealable paperboard according to the independent claims of the present invention. The dependent claims are related to preferred embodiments. They may be combined freely unless the context clearly indicates otherwise.

The invention provides a heat-sealable paperboard comprising:

a paperboard substrate comprising a first side and a second side, a first dispersion coating layer on the first side of the paperboard substrate, and a second dispersion coating layer on the first dispersion coating layer, wherein the first dispersion coating layer comprises a latex and pigments and the second dispersion coating layer comprises a polyolefin.

The heat-sealable paperboard comprises a double coating including a first coating comprising latex and pigment in contact with the baseboard and a second coating comprising dispersion coated polyolefin on the side that will form the inside of a thereof formed package. This combination of first and second dispersion coating layers achieves several advantages. The paperboard provides good heat-sealability, good barrier properties and excellent mechanical properties. It has surprisingly been found that the paperboard can be converted to a packaging reducing or even without problems with cracks formed in the coating. It is assumed that this is enabled by the advantageous mechanical properties, including a high stretch at break. Without being bound to a specific theory, it is assumed that the pre-coating of a first dispersion coating layer of latex and pigments hinders the second layer of polyolefin dispersion to penetrate into the paperboard substrate whereby a smooth coating of uniform thickness is accomplished, which is believed to contribute to the high mechanical properties.

It is a further important advantage that the surfaces of the heat-sealable paperboard exhibits a low friction, which facilitates converting and handling of the thereof formed packaging or cups. This is especially advantageous at the piling of packages or cups. The paperboard in addition is repulpable, and the reject level in the repulping of the paperboard or a packaging made thereof may be less than 10 wt %, based on the dry weight. The paperboard further fulfills the food safety legislations.

As used herein, "paperboard substrate" or "baseboard" refers to a paper based substrate of an amalgamation of fibers that can include, at least in part, vegetable, wood, and/or synthetic fibers. The paperboard substrate preferably comprises cellulosic fibers. A typical paperboard substrate used for packaging material comprises at least one ply, preferably several plies. The paperboard substrate is preferably a multilayer paperboard, comprising at least two layers of a back ply and a top ply. The paperboard substrate may further comprise one or several middle plies. The paperboard substrate for example may comprise a top ply and a back ply and a middle ply.

The grammage of a paper layer or coating layer refers to the weight expressed as grams per square meter, gsm or $g/m^2$. As used herein, gsm and $g/m^2$ may be used interchangeable.

As used herein, "dispersion coating layer" refers to a layer that has been applied by dispersion coating onto the paperboard substrate. As used herein, "dispersion coating" refers to a coating technique where an aqueous dispersion of fine polymer particles is applied to the surface of a paper or paperboard to form a solid, substantially non-porous film after drying. The dispersion coating layers may be applied by the use of roller coating, spray coating, curtain, blade coating, slot coating, immersion coating, gravure roll coating, reverse direct gravure coating, rod coating, soft-tip blade coating and/or combinations thereof. Preferred coating methods are blade coating and rod coating. Dispersion coatings can be recycled. As used herein, "dispersion coated polyolefin" refers to polyolefin applied by dispersion coating.

Dispersion coating may be used to apply a layer providing barrier properties to the paperboard substrate. As used herein, a "barrier coating layer" or "barrier layer" refers to a coating layer providing barrier properties to the paperboard substrate by reducing or eliminating permeability, for example of gases such as oxygen through the material and/or the absorption of liquids in the fiber structure. Barrier coatings are required to prevent the egress of packaged products such as liquids, and to prevent the ingress into the package of oxygen, moisture, grease, oil or other contaminants that might deteriorate the quality of the packaged product.

A "printing surface" is meant to define a surface adapted to be printed. The "print side" of a paperboard thus refers to the outward side of a package formed from the paperboard. An "inside" layer of a paperboard refers to the side intended to come into contact with a content in a package formed from the paperboard. Referring to the paperboard substrate comprising a first side and a second side, the first side refers to the "inside" or "reverse side" of a thereof formed package, while the second side refers to the "print side".

As used herein, "pigment" refers to extenders, fillers and coatings such as clay, chalk or kaolin used for papermaking as usually referred to in the paper industry.

If not specifically denoted otherwise, given % are weight %, and are calculated on the basis of a dry weight of 100 weight % of the respective object, such as a layer, ply or packaging. The total amount of all components of a layer, ply or packaging does not exceed 100 wt %.

The stretch at break (CD), providing a measure of the mechanical properties, of the paperboard as expressed herein is determined by tensile strength according to ISO 1924-2.

The water absorption rate (COBB 600) is determined according to SCAN-test P 12:64 (1964)).

The reject received from the repulping of the packaging material is determined according to PTS test method RH021/97.

The present invention will be further described in connection with various embodiments and other aspects. They may be combined freely unless the context clearly indicates otherwise.

As used herein, "latex" refers to a polymer applied or coated from an aqueous suspension of polymer particles selected from the group comprising styrene-butadiene latex, styrene-acrylate latex, acrylate latex, vinyl acetate latex, vinyl acetate-acrylate latex, styrene-butadiene-acrylonitrile latex, styrene-acrylate-acrylonitrile latex, styrene-butadiene-acrylate-acrylonitrile latex, styrene-maleic anhydride latex, styrene-acrylate-maleic anhydride latex, or mixture of these latexes. The latex can be natural polymers, synthetic polymers, synthetic polymers derived from biomass, or combinations thereof. The latex can be biobased, i.e. derived from biomass, such as biobased styrene-acrylate or styrene-butadiene latex. Biobased latex can provide similar performance, and provides improved carbon footprint.

In embodiments, the latex in the first dispersion coating layer is selected from styrene-acrylate (SA) latex, styrene-butadiene (SB) latex, or a mixture thereof. Preferably, the first dispersion coating layer may comprise latex as the only binder. In embodiments of the heat-sealable paperboard, the first dispersion coating layer comprises the latex in an amount in a range from ≥30 wt % to ≤70 wt %, based on the dry solid content of the layer. The first dispersion coating layer may comprise latex in an amount around 40 wt %, based on the dry solid content of the layer.

In embodiments, the first dispersion coating layer comprises pigment in an amount in a range from ≥30 wt % to ≤70 wt %, based on the dry solid content of the layer. The first dispersion coating layer may comprise pigments in an amount in a range from ≥55 wt % to ≤70 wt % or in an amount of or around 60 wt %, based on the dry solid content of the layer. Pigments may improve the barrier properties of the dispersion coating layer. A high amount of pigment enables an efficient barrier at a low coat weight. In embodiments, the pigment is selected from clay and/or talc. These pigments are preferred for food safety reasons. The clay may be kaolin clay.

In embodiments, the first dispersion coating layer has a grammage in a range from ≥5 g/m$^2$ to ≤15 g/m$^2$. Preferably, the first dispersion coating layer has a grammage in a range from ≥5 g/m$^2$ to ≤10 g/m$^2$. A layer comprising latex and a high amount of pigments contacting the baseboard can provide suitable barrier properties at a low coat weight.

The first dispersion coating layer may comprise latex in an amount of 30-70 wt % and pigments in an amount of 70-30 wt %, preferably around 60 wt %, based on a dry solid content of the layer of 100 wt %. The first dispersion coating layer provides an inner barrier layer comprising latex and pigments, contacting the paperboard on one side and the second dispersion coating layer on its other side. The pre-coating of latex and pigments advantageously can hinder the additional layer of polyolefin dispersion to penetrate into the paperboard substrate. Thereby, a smooth coating of uniform thickness of the second inside layer may be accomplished, which is believed to contribute to the high mechanical properties of the coated paperboard.

The second dispersion coating layer comprises dispersion coated polyolefin. In embodiments, the polyolefin is selected from the group of polyethylene (PE), polypropylene (PP) and/or copolymers of polyethylene and polypropylene. These polymers provide desirable properties such as high moisture resistance and low heat-seal temperature. In a preferred embodiment, the second dispersion coating layer comprises a co-polymer of polyethylene and polypropylene. Particularly co-polymers of polyethylene and polypropylene provide advantageous heat-sealability for food packaging.

In embodiments, the second dispersion coating layer comprises the polyolefin in an amount in a range from ≥90 wt % to ≤100 wt %, preferably in a range from ≥90 wt % to ≤98 wt %, based on the dry solid content of the layer. The second dispersion coating layer may comprise the polyolefin in an amount in a range from ≥95 wt % to ≤100 wt %, based on the dry solid content of the layer. A high amount of polyolefin further contributes to the heat-sealability properties.

The second dispersion coating layer preferably is free of pigments. The second dispersion coating layer may comprise a co-binder, preferably in small amounts. Co-binders may be selected from starch, carboxymethyl cellulose (CMC) and latex. Preferably, the co-binder is a latex.

Preferably, the latex is selected from styrene-butadiene latex, styrene-acrylate latex, or a mixture thereof. In embodiments, the second dispersion coating layer comprises a co-binder in a range from ≥0 wt % to ≤5 wt %, preferably in a range from ≥1 wt % to ≤5 wt %, based on the dry solid content of the layer.

The second dispersion coating layer may comprise additives. Additives may be selected from the group of water retention agents, rheology modifiers, defoamers, antifoaming agents, pH adjustment additives, cross linkers, thickening agents, dispersing aids, slip additives, fillers, release agents, preservatives and antiblocking agents. Preferably, additives are selected from water retention agents, rheology modifiers, defoamers, cross-linkers, pH adjustment additives or thickeners. The second dispersion coating layer may comprise additives in a range from ≥0 wt % to ≤5 wt %, preferably in a range from ≥1 wt % to ≤5 wt %, based on the dry solid content of the layer.

In embodiments, the second dispersion coating layer has a grammage in a range from ≥5 $g/m^2$ to ≤15 $g/m^2$. Preferably, the second dispersion coating layer has a grammage in a range from ≥5 $g/m^2$ to ≤10 $g/m^2$. Advantageously, the inside polyolefin layer can be applied at a low coat weight.

On the side that will form the inside of a thereof formed package the paperboard thus comprises a double coating of a first layer comprising latex and pigment in contact with the baseboard and a second layer comprising dispersion coated polyolefin. Advantageously, no further inside layer is needed. The first and second dispersion coating layers preferably are the only coating layers on the inside of the paperboard. The second inside coating is preferably in contact with the content in a thereof formed package or cup.

The paperboard substrate comprises a second side. In a package formed from the coated paperboard, this second side will face the outside and provide the print-side of the package.

In embodiments, the paperboard substrate comprises on the second side a third dispersion coating layer, wherein the third dispersion coating layer comprises dispersion coated polyolefin in an amount in a range from ≥50 wt % to ≤100 wt %, based on the dry solid content of the layer. The polyolefin may be selected from polyethylene, polypropylene and/or copolymers of polyethylene and polypropylene. The polymer used on the inside and on the print side may be the same, or different polymers can be used. In this embodiment, the print-side layer may further comprise latex and pigments. In this embodiment, the third dispersion coating layer comprises a latex and pigments, together being present in an amount in a range from ≥0 wt % to ≤50 wt %, based on the dry solid content of the layer. The latex in the third dispersion coating layer may be selected from styrene-acrylate latex, styrene-butadiene latex, or a mixture thereof. The latex in the first and third dispersion coating layer may be the same, or different latexes can be used for the respective layers. The pigment preferably is selected from clay and/or talc. In this embodiment, the third dispersion coating layer may comprise additives in a range from ≥0 wt % to ≤10 wt %, based on the dry solid content of the layer. Additives may be selected from water retention agents, defoamers, cross-linkers, pH adjustment additives or thickeners. In this embodiment, the third dispersion coating layer, to form the print-side, may comprise dispersion coated polyolefin in a range of 50%-100 wt %, latex and pigment in a range of 50%-0 wt % and additives in a range from 0-10 wt %, based on a dry solid content of the layer of 100 wt %. This coating provides a surface suitable for printing. This coating further provides a barrier against condensation if used for packages for cold liquid. Advantageously, no further print side layer is needed. In this embodiments, the third dispersion coating layer preferably is the only coating layer on the print side of the paperboard. In this embodiments, the third dispersion coating layer preferably forms an outermost, printable coating.

In an alternative embodiment, the paperboard substrate comprises on the second side a third dispersion coating layer, wherein the third dispersion coating layer comprises polyolefin in an amount in a range from ≥90 wt % to ≤100 wt %, preferably in a range from ≥95 wt % to ≤100 wt %, based on the dry solid content of the layer. In this embodiment, the third dispersion coating layer on the print side preferably is designed similar or corresponds to the second dispersion coating layer on the first side. For the description of the third dispersion coating layer of this embodiment reference is made to the description of the second dispersion coating layer as described above. The polyolefin may be the same or different from the polyolefin of the second dispersion coating layer and may be selected from polyethylene (PE), polypropylene (PP) and/or copolymers of polyethylene and polypropylene. The polyolefin preferably is a copolymer of polyethylene and polypropylene and the layer preferably is free of pigments.

In this embodiment, the heat-sealable paperboard may comprise a paperboard substrate, wherein the first side of the paperboard substrate is coated with a first dispersion coating layer comprising 40 wt % of latex and 60 wt % of pigment and a second dispersion coating layer on the first dispersion coating layer, the second dispersion coating layer comprising from ≥95 wt % to ≤100 wt % of polyolefin and preferably being free of pigment, and wherein the second or print side of the paperboard substrate is coated with a third dispersion coating layer comprising from ≥95 wt % to ≤100 wt % of polyolefin and preferably being free of pigment, all wt % based on the dry solid content of the respective layer. Such an embodiment is particularly useful as a side material for a packaging such as a cup formed form the heat-sealable paperboard.

In a further alternative embodiment, the paperboard substrate comprises on the second side a third dispersion coating layer and a fourth dispersion coating layer on the third dispersion coating layer, wherein the third dispersion coating layer comprises a latex and pigment and the fourth dispersion coating layer comprises a polyolefin. In this embodiment, the third dispersion coating layer on the print side preferably is designed similar or corresponds to the first dispersion coating layer on the first side. Similarly, the fourth dispersion coating layer preferably is designed similar or corresponds to the second dispersion coating layer on the first side. This embodiment thus preferably provides a symmetrical arrangement of the dispersion coating layers on both sides of the paperboard substrate. For the description of the third and fourth dispersion coating layer of this embodiment reference is made to the first and second dispersion coating layers, respectively, as described above.

In this embodiment, the heat-sealable paperboard preferably may comprise a paperboard substrate, wherein the first side of the paperboard substrate is coated with a first dispersion coating layer comprising 40 wt % of latex and 60 wt % of pigment and a second dispersion coating layer on the first dispersion coating layer, the second dispersion coating layer comprising from ≥95 wt % to ≤100 wt % of polyolefin and preferably being free of pigment, and wherein the second side of the paperboard substrate is coated with a third dispersion coating layer comprising comprising 40 wt % of latex and 60 wt % of pigment and a fourth dispersion coating layer on the third dispersion coating layer, the fourth dispersion coating layer comprising from ≥95 wt % to ≤100 wt % of polyolefin and preferably being free of pigment, all wt % based on the dry solid content of the respective layer.

On the side that will form the inside of a thereof formed package the paperboard of this embodiment thus may comprise a double coating of a first layer comprising latex and pigment in contact with the baseboard and a second layer comprising dispersion coated polyolefin. First and second dispersion coating layers preferably are the only coating layers on the inside of the paperboard. The second inside coating is preferably in contact with the content in a thereof formed package or cup. On the side that will form the outer side of a thereof formed package the paperboard of this embodiment thus also comprises a double coating of a third layer comprising latex and pigment in contact with the baseboard and a fourth layer comprising dispersion coated polyolefin. Third and fourth dispersion coating layers preferably are the only coating layers on the outer side of the paperboard. Such an embodiment is particularly useful as a bottom material for a packaging such as a cup formed form the heat-sealable paperboard.

The paperboard substrate is preferably a multi-layer paperboard, comprising a top ply and a back ply and one or several middle plies. The middle ply may provide bulk. Preferably, the paperboard substrate, also denoted baseboard, is a three-ply paperboard comprising a top ply, a middle ply and a back ply. The paperboard substrate may have a basis weight of about 150 gsm, preferably of about 200 gsm, or of about 300 gsm. A multilayer paperboard is particularly suitable for liquid and/or food packaging. The one or more middle plies can contain sulphate/kraft pulp and CTMP, which advantageously provide bulk. The pulp can be unbleached or bleached. The middle ply may comprise fibres originating from chemi-thermomechanical pulp (CTMP) or thermomechanical pulp (TMP). Preferably, the middle ply comprises sulphate pulp and CTMP. The top and back ply preferably comprise sulphate pulp. Top and back ply preferably will not comprise CTMP fibres. The first side of the paperboard substrate may become the inside side/reverse side, while the second side may become the print side of a thereof formed packaging.

The baseboard may be surface sized. Particularly, the top ply and/or the back ply of the paperboard substrate may be untreated or surface sized, for example with a thin layer of starch, on one or both sides. Surface sizing is applied prior to the application of the coating layers. The surface sizing may comprise or consist of modified starches or comprise surface sizing agents such as acrylic co-polymers. Surface sizing further enhances the barrier properties of the dispersion coating.

The heat-sealable paperboard advantageously provides excellent mechanical properties. In embodiments, the paperboard has

- a stretch at break (CD), determined by tensile strength according to ISO 1924-2, of ≥5%, preferably ≥6% or ≥7% and/or
- a water absorption rate, COBB 600, determined according to SCAN-test P 12:64, of ≤10 $g/m^2$, preferably ≤5 $g/m^2$.

The water absorption rate is measured on the coated first side of the paperboard, i.e. on the side to form the reverse side/inside of the thereof formed package.

These mechanical properties, including a high stretch at break, enable the paperboard to be converted to a packaging without problems of cracks forming in the coating.

Further, the surfaces of the structure advantageously exhibits a low friction. In embodiments, the paperboard provides a static coefficient of friction (mean) of below 5, as measured on the inside side versus print side. The static coefficient of friction refers to the measurement of the angle of slide using an inclined plane, and for coated paperboards may be determined according to ISO 15359:1999. A low static coefficient of friction facilitates the handling of the thereof formed packaging or cups, for example for piling of the packages or cups.

The paperboard or a packaging made from the paperboard may be recycled into other paper products using common repulping technology. In the repulping the cellulose fibers are separated, and after cleaning are recyclable. The unrepulped fraction is referred to as rejects. Rejects have to be removed for disposal or burning. The reject level determined according to PTS test method RH021/97 received from the repulping of the paperboard may be less than 12 wt %, preferably less than 10 wt %, preferably less than 7 wt % or less than 5 wt %, based on a dry weight of the paperboard of 100 weight %. The paperboard shows very good repulpability. The paperboard thus provides a repulpable paperboard.

The paperboard advantageously provides barrier properties, is heat-sealable, repulpable, and provides good mechanical properties for converting. The paperboard thus is suitable to be used in packages for both cold and hot liquids or food as well as frozen food. The paperboard further enables easy handling of thereof formed packages when piled, and fulfills food safety requirements.

The invention further relates to a method of manufacturing a heat-sealable paperboard, the method comprising the steps of:

- providing a paperboard substrate comprising a first side and a second side,
- applying a first dispersion coating layer on the first side of the paperboard substrate,
- applying a second dispersion coating layer on the first dispersion coating layer, and
- optionally applying a third dispersion coating layer on the second side of the paperboard substrate,
- wherein the first dispersion coating layer comprises a latex and pigment and the second dispersion coating layer comprises a polyolefin.

The method further may comprise applying a fourth dispersion coating layer on the third dispersion coating layer. For the description of the dispersion coating layers reference is made to the description above. The dispersion coating layers are formed by dispersion coating. The dispersion layers may be applied by customary methods such as the use of roller coating, spray coating, curtain, blade coating, slot coating, immersion coating, gravure roll coating, reverse direct gravure coating, rod coating, soft-tip blade coating and/or combinations thereof. Preferably, the coating method is blade coating or rod coating. The method is usable for manufacturing a heat-sealable paperboard as described above.

The invention further relates to a packaging comprising or being made from the heat-sealable paperboard as described above. The packaging is preferably made by use of heat-sealing of the paperboard as described above. The heat-sealable paperboard may be sealed by other methods than heat-sealing, but heat-sealing is widely used in the food packaging field. The packaging is particularly usable as container for both, cold and hot liquids or food, as well as for frozen food. The packaging may be used as a beverage container, such as a cup.

In embodiments, the packaging may be manufactured from two different embodiments of the heat-sealable paperboard as described above. The bottom of the packaging such as a cup may be manufactured from a heat-sealable paperboard comprising first, second, third and fourth dispersion coating layers as described above, while the side material may be manufactured from a heat-sealable paperboard comprising first, second and third dispersion coating layers, wherein the third dispersion coating layer comprises from ≥95 wt % to ≤100 wt % of polyolefin and is free of pigment.

Further features of the present invention will become apparent from the example and figure, wherein.

Figure 1:
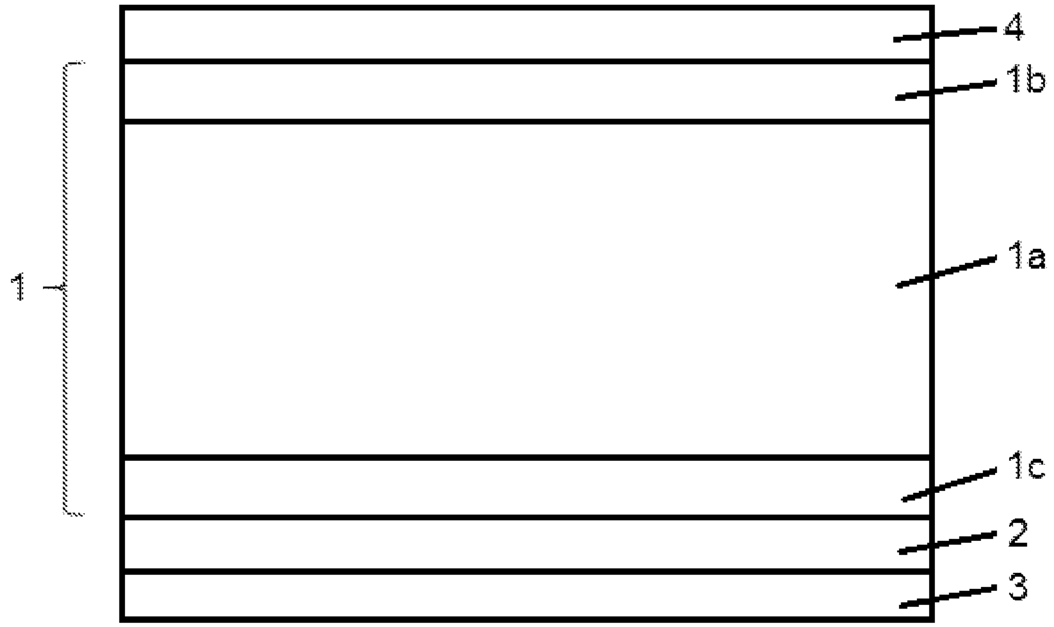
FIG. 1 is a schematic drawing of a heat-sealable paperboard according to an embodiment of the invention.

The heat-sealable paperboard as shown in FIG. 1 comprises a paperboard substrate 1, comprising three plies, a middle ply 1*a*, a top ply 1*b*, and a back ply 1*c*. The middle layer 1*a* contains CTMP and sulphate pulp. The top ply 1*b* and the back ply 1*c* comprise sulphate pulp. The paperboard substrate comprises a first side and a second side, wherein the top ply 1*b* is arranged on the second side and the back ply 1*c* on the first side. The first side refers to the inside of a packaging such as a container made from the heat-sealable paperboard, while the second side refers to the print side of such a packaging.

On the first side of the heat-sealable paperboard, on the back ply 1*c*, the paperboard substrate 1 comprises a first dispersion coating layer 2, forming a first inside layer. The first dispersion coating layer 2 comprises a latex and pigment. The latex preferably is selected from styrene-butadiene latex, styrene-acrylate latex, or a mixture thereof. The pigment preferably is selected from clay or talc. A second dispersion coating layer 3 comprising a polyolefin is coated on the first dispersion coating layer 2. The second dispersion coating layer 3 forms a second inside layer. The polymer preferably is a copolymer of polyethylene and polypropylene. The polyolefin may be present in an amount in a range from ≥90 wt % to ≤100 wt %, based on the dry solid content of the layer. The second dispersion coating layer 3 may be free of pigments. The second dispersion coating layer 3 will be in contact with the content of a container produced from the paperboard.

On the second side of the paperboard, the top ply 1*b* is coated with a third dispersion coating layer 4. The dispersion coating layer 4 forms the printing surface of the heat-sealable paperboard. The paperboard may be printed directly on the dispersion coating layer 4. The third dispersion coating layer 4 comprises a polyolefin in an amount in a range from ≥50 wt % to ≤100 wt %, based on the dry solid content of the layer. The third dispersion coating layer 4 further may comprise a latex and pigment, together being present in an amount in a range from ≥0 wt % to ≤50 wt %, based on the dry solid content of the layer.

In an alternative embodiment, the third dispersion coating layer 4 comprises a polyolefin in an amount in a range from ≥95 wt % to ≤100 wt %, based on the dry solid content of the layer, and is preferably free of pigment. The paperboard may be printed directly on such a dispersion coating layer 4. The material of such embodiment is particularly suitable for the manufacture of the sides of heat-sealed product packages for cold and hot liquids or food, and frozen food.

Figure 2:
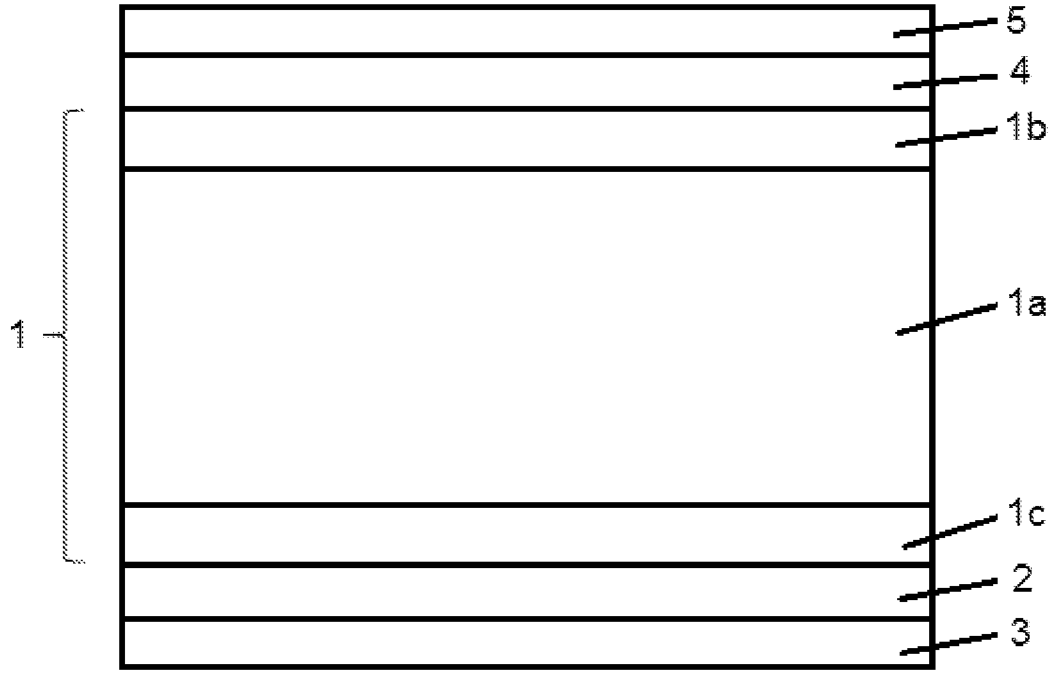
FIG. 2 is a schematic drawing of a heat-sealable paperboard according to another embodiment of the invention.

The heat-sealable paperboard as shown in FIG. 2 comprises a paperboard substrate 1, a first dispersion coating layer 2, forming a first inside layer and second dispersion coating layer 3 will be in contact with the content of a container produced from the paperboard as described for FIG. 1. On the second side of the paperboard, the top ply 1*b* is coated with a third dispersion coating layer 4. The third dispersion coating 4 comprises a latex and pigment. The latex preferably is selected from styrene-butadiene latex, styrene-acrylate latex, or a mixture thereof. The pigment preferably is selected from clay or talc. A fourth dispersion coating layer 5 comprising a polyolefin is coated on the third dispersion coating layer 4. The fourth dispersion coating layer 5 forms the outer surface of the heat-sealable paperboard. The polymer preferably is a copolymer of polyethylene and polypropylene. The polyolefin may be present in an amount in a range from ≥90 wt % to ≤100 wt %, based on the dry solid content of the layer. The fourth dispersion coating layer 5 may be free of pigments. The second dispersion coating layer 3 will be in contact with the content of a container produced from the paperboard. The material as shown in FIG. 2 is particularly suitable for the manufacture of the bottom of a heat-sealed product package for cold and hot liquids or food, and frozen food.

The material as shown in FIG. 1 and FIG. 2 is particularly suitable for the manufacture of heat-sealed product packages for cold and hot liquids or food, and frozen food.

Example 1

In order to evaluate the packaging material of the invention, a test series was performed in which the barrier properties, the stretch at break and the static coefficient of friction of packaging material manufactured in accordance with the invention was evaluated in a laboratory trial using a rod coater.

A first dispersion coating composition (Dispersion 1) was prepared according to the table 1. All percentages calculated as dry solid content (wt %). A second dispersion coating (Dispersion 2) was prepared comprising 100 wt % copolymer of polyethylene and polypropylene, as calculated on the dry solid content.

The coating compositions were coated by use of a rod coater on a paperboard Cupforma Natura (baseboard) of different grammages from 195 to 295 gsm, which is a three-layer paperboard with two outer layers made of bleached kraft pulps and a middle layer comprising bleached kraft pulp and CTMP. In all the samples 1-4, the dispersion 1 were coated on a first side (reverse side) of the paperboard to form first, innermost coating layer with a grammage of 7 gsm, whereupon the dispersion 2 were coated onto said first inner coating layer forming a second coating layer with a grammage of 7 gsm. Sample 1 and 2 were further coated on the second side (print side) of the baseboard with Dispersion 2 forming a third coating layer of 5 gsm. Sample 3 were further coated on the second side with dispersion 1 forming a third coating layer with a grammage of 7 gsm whereupon dispersion 2 were coated onto said third coating layer forming a fourth coating layer with a grammage of 7 gsm.

The samples were thus prepared to show the following coating structures:

Sample 1 and 2: Dispersion 2/Baseboard/Dispersion 1/Dispersion 2

Sample 3: Dispersion 2/Dispersion 1/Baseboard/Dispersion 1/Dispersion 2

Sample 4: Baseboard/Dispersion 1/Dispersion 2

TABLE 1

| Raw material | Dispersion 1 [wt %] |
|---|---|
| Styrene acrylate latex | 40.6 |
| Clay pigment | 58.1 |
| Dispersion agent | 0.1 |
| NaOH | 0.1 |
| PVOH | 0.3 |
| Crosslinker | 0.3 |
| Defoamer | 0.4 |

As a reference, a first reference sample (Ref Board 1) was prepared by coating a paperboard baseboard (Tambrite 240 gsm) with Dispersion 1 to provide a coating layer of 7 gsm. A second reference sample (Ref Board 2) was prepared by providing a paperboard baseboard (Tambrite 240 gsm) with a first coating layer of Dispersion 1 (5 gsm) and a second dispersion coating layer (10 gsm) comprising 100 wt % styrene-acrylate latex onto said first coating layer.

The properties of the packaging materials of the invention and the reference board are summarized in table 2. The water absorption (COBB600) is measured on the first side/reverse side (RS) of the coated paperboard samples.

TABLE 2

| | Sample 1 | Sample 2 | Sample 3 | Sample 4 | Ref Board 1 | Ref Board 2 |
|---|---|---|---|---|---|---|
| Baseboard Grammage [g/m$^2$] | 214 | 214 | 195 | 295 | 240 | 240 |
| Stretch at break CD [%] | 5.63 | 6.22 | 6.57 | 5.32 | 3.81 | 3.60 |
| Static coefficient of friction (mean) | 0.410 | 0.397 | 0.332 | 0.477 | 0.661 | 0.843 |
| Cobb600 RS [g/m2] | 3.5 | 1.5 | 2.0 | 2.3 | 84.0 | 6.1 |
| PTS reject level [%] | 11.2 | 11.1 | — | — | — | — |

As can be seen in table 2, the packaging materials made in accordance with the invention shows a low water absorption, a high stretch at break, a low static coefficient of friction and a low PTS reject level.

The invention claimed is:

1. A packaging comprising:

a heat-sealable paperboard comprising:

a paperboard substrate comprising a first side and a second side, a first dispersion coating layer on the first side of the paperboard substrate, wherein the first dispersion coating layer has a grammage in a range from ≥5 g/m$^2$ to ≤10 g/m$^2$, a second dispersion coating layer on the first dispersion coating layer, wherein the second dispersion coating layer has a grammage in a range from ≥5 g/m$^2$ to ≤10 g/m$^2$, and, a third dispersion coating layer on the second side of the paperboard substrate, wherein the first dispersion coating layer comprises a latex and pigment, and wherein the second dispersion coating layer comprises polyethylene in an amount in a range from ≥90 wt % to ≤100 wt %, based on a dry solid content of the second dispersion coating layer, and wherein the third dispersion coating layer comprises polyolefin in an amount in a range from ≥90 wt % to ≤100 wt %, based on a dry solid content of the third dispersion coating layer, wherein the first side of the paperboard substrate forms an inside of the packaging and the second side of the paperboard substrate forms a print side of the packaging, and wherein a reject level determined according to PTS test method RH021/97 received from a repulping of the paperboard is less than 12 wt %, based on a dry weight of the paperboard of 100 wt %.

2. The packaging according to claim 1, wherein the latex is selected from a group consisting of styrene-acrylate latex, styrene-butadiene latex, and a mixture thereof.

3. The packaging according to claim 1, wherein the first dispersion coating layer comprises the latex in an amount in a range from ≥30 wt % to ≤70 wt %, based on a dry solid content of the layer.

4. The packaging according to claim 1, wherein the first dispersion coating layer comprises the pigment in an amount in a range from ≥30 wt % to ≤70 wt %, based on a dry solid content of the layer.

5. The packaging according to claim 1, wherein the pigment is selected from a group consisting of clay, talc, and combinations thereof.

6. The packaging according to claim 1, wherein the second dispersion coating layer is selected from a group consisting of polyethylene (PE), copolymers of polyethylene and polypropylene, and combinations thereof.

7. The packaging according to claim 1, wherein the second dispersion coating layer comprises a co-binder in a range from ≥0 wt % to ≤5 wt %, based on a dry solid content of the layer.

8. The packaging according to claim 1, wherein the third dispersion coating layer further comprises a latex and one or more pigment, together being present in a range from ≥0 wt % to ≤50 wt %, based on the dry solid content of the layer.

9. The packaging according to claim 1, wherein the paperboard substrate further comprises, on the second side, a fourth dispersion coating layer on the third dispersion coating layer, wherein the fourth dispersion coating layer comprises a polyolefin.

10. The packaging according to claim 1, wherein the paperboard has a stretch at break (CD, determined by tensile strength according to ISO 1924-2) of ≥5%, or a water absorption rate (COBB 600, determined according to SCAN-test P 12:64) of ≤10 g/m$^2$ or, both.

11. The packaging according to claim 7, wherein the co-binder comprises a latex.

12. The packaging according to claim 1, wherein the packaging is selected from the group consisting of food packaging, beverage packaging, and combinations thereof.

13. A packaging comprising:

a heat-sealable paperboard comprising:

a paperboard substrate comprising a first side and a second side, a first dispersion coating layer on the first side of the paperboard substrate, wherein the first dispersion coating layer has a grammage in a range from ≥5 g/m$^2$ to ≤10 g/m$^2$, a second dispersion coating layer on the first dispersion coating layer, wherein the second dispersion coating layer has a grammage in a range from ≥5 g/$m^2$ to ≤10 g/$m^2$, and, a third dispersion coating layer on the second side of the paperboard substrate, wherein the first dispersion coating layer comprises a latex and pigment, wherein the second dispersion coating layer comprises a polyolefin in an amount in a range from ≥90 wt % to ≤100 wt %, based on a dry solid content of the second dispersion coating layer, wherein the third dispersion coating layer comprises polyolefin in an amount in a range from ≥90 wt % to ≤100 wt %, based on a dry solid content of the third dispersion coating layer, wherein the first side of the paperboard substrate forms an inside of the packaging and the second side of the paperboard substrate forms a print side of the packaging, wherein a reject level determined according to PTS test method RH021/97 received from a repulping of the paperboard is less than 12 wt %, based on a dry weight of the paperboard of 100 wt %, and wherein the first dispersion coating layer and the second dispersion coating layer are the only coating layers on the first side of the paperboard substrate.

* * * * *